United States Patent [19]

Kleinschmidt et al.

[11] Patent Number: 5,228,333

[45] Date of Patent: Jul. 20, 1993

[54] PRESSURE AND HEAT-FLOW SENSOR FOR THE COMBUSTION CHAMBER OF INTERNAL COMBUSTION ENGINES

[75] Inventors: Peter Kleinschmidt, Munich; Hans Meixner, Haar; Randolf Mock, Munich; Hans Winter, Höhenkirchen-Siegertsbrunn, all of Fed. Rep. of Germany

[73] Assignee: Siemens Aktiengesellschaft, Munich

[21] Appl. No.: 820,645

[22] PCT Filed: Jul. 27, 1990

[86] PCT No.: PCT/DE90/00582

§ 371 Date: Jan. 16, 1992

§ 102(e) Date: Jan. 16, 1992

[87] PCT Pub. No.: WO91/19966

PCT Pub. Date: Dec. 26, 1991

[30] Foreign Application Priority Data

Jul. 27, 1989 [DE] Fed. Rep. of Germany ....... 3924949

[51] Int. Cl.[5] .......................................... G01M 15/00
[52] U.S. Cl. .......................................... 73/115; 73/714; 374/29; 374/144
[58] Field of Search .................... 73/714, 115; 374/29, 374/43, 44, 143, 144

[56] References Cited

U.S. PATENT DOCUMENTS 4,299,117 11/1981 Andrews et al. .................. 73/35
4,936,147 6/1990 EerNisse et al. ............... 374/143 X

FOREIGN PATENT DOCUMENTS 2064395 7/1972 Fed. Rep. of Germany .
3714131 11/1988 Fed. Rep. of Germany .
3727221 2/1989 Fed. Rep. of Germany .

Primary Examiner—Jerry W. Myracle
Attorney, Agent, or Firm—Hill, Steadman & Simpson

[57] ABSTRACT

Integrated design of a combustion pressure sensor (11, 12, 13, 14) and combustion heat-flow sensor (21) which is suitable for determining a physical variable of the combustion process of an engine.

5 Claims, 1 Drawing Sheet

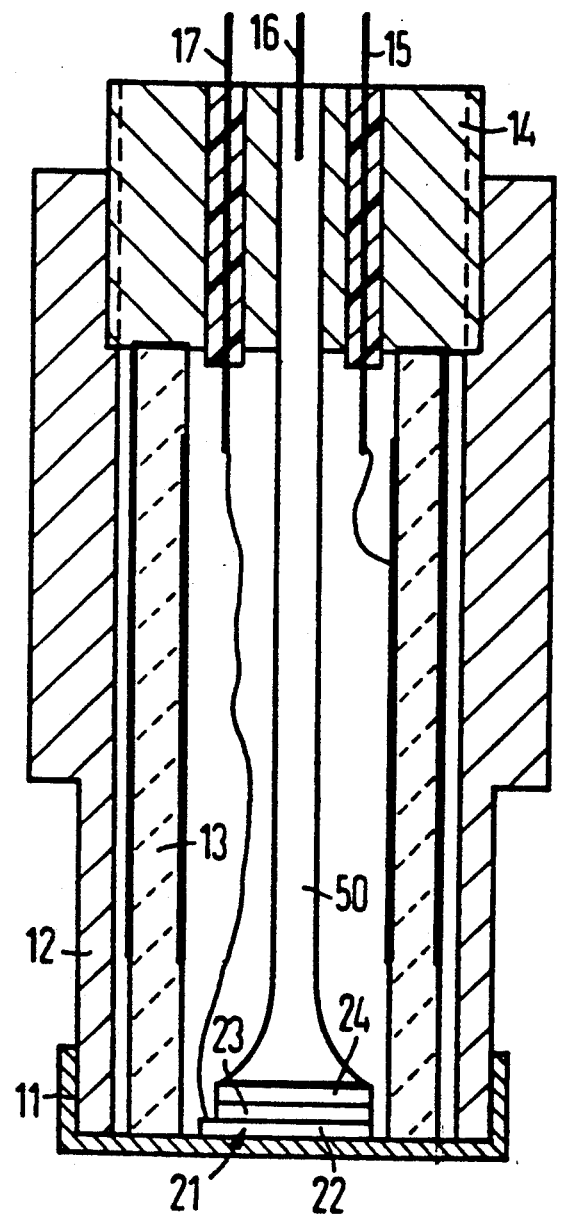

PRESSURE AND HEAT-FLOW SENSOR FOR THE COMBUSTION CHAMBER OF INTERNAL COMBUSTION ENGINES

BACKGROUND OF THE INVENTION

The present invention relates to a sensor for measuring both the combustion pressure and the heat flow in the combustion chamber of an internal combustion engine, in particular, for motor vehicles. In addition to the combustion pressure, the heat flow through the engine block and the gas temperature in the combustion chamber are also of interest as a further thermodynamic variable. These variables are to be detected. Since the possibility of making additional bores in the engine block for additional sensors is highly restricted, a technical procedure is sought according to the teaching solving the present problem. The technical teaching indicated in the present invention solves the abovementioned problem. The invention is based on the object of integrating the heat-flow sensor in the provided pressure sensor which projects into the combustion chamber of the engine. The invention relates, but not in a restrictive manner, especially to pressure sensors as disclosed in the German Offenlegungsschriften DE-OS 3 714 131 and 3 727 221.

These known pressure sensors have as components which are of particular interest here a diaphragm whose one side delimits the combustion chamber of the engine and on whose opposite diaphragm surface a tappet or the like rests so that the pressure prevailing on the other side of the diaphragm can be transmitted as a force from this diaphragm surface to a sensor element of the pressure sensor. This sensor element is particularly a piezoelectric sensor, preferably in the form of a plate to be bent or a tube of piezo material to be loaded in the axial direction with the pressure. In particular piezo ceramic such as lead zirconate titanate and the like are used as piezoelectric material. This material is cheap and technically sophisticated.

SUMMARY OF THE INVENTION

According to the invention, it is provided that the thermo sensor of the present invention, be attached on the, with respect to the pressure sensor, internal diaphragm surface, specifically with good heat contact with the diaphragm. By this means this temperature sensor is subjected virtually directly to the heat of the combustion gases which flow around the, again with respect to the pressure sensor, opposite external diaphragm surface.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing, and in which:

The single FIG. is a cross-sectional view of the sensor of the present invention.

DESCRIPTION OF THE PREFERRED EMBODIMENT

The heat-flow sensor according to the invention consists of two temperature sensors, as is shown by the enclosed figure of a particularly preferred integrated embodiment of the invention. Only the basic form of this pressure sensor is illustrated in this figure and the diaphragm is designated by 11, the pressure sensor housing to be inserted into the engine block by 12, the piezoelectric tube by 13 and the support point of the pressure sensor by 14. The one pole for the electric pressure sensor signal is designated by 15, the support point 14 being the second pole in the present embodiment. Connection bushings for the feed lines to the heat-flow sensor 21 provided according to the invention are designated by 16 and 17.

Additional details as to how a heat-flow sensor in itself can be designed in practice and which details are important then, are disclosed in DE-OS 2 064 395. In particular, more detailed information relating to special embodiments of the temperature sensors or of the thermoelements and their circuitry can be found in this publication.

As can be seen from the figure, this heat-flow sensor 21 is coupled with its one plate 22 closely in terms of temperature to the diaphragm 11. The second plate 24 of the temperature sensor is preferably coupled thermally to a component which has the property of coupling this second plate 24 to a heatsink. The heat-conducting part can be, for example, a copper heat conductor 50. This heat conductor can also have the function of an electrical feed line to the external electrode of the plate 24. The interior of the tube 13 can also be filled with a material which conducts away heat in such a way that the conduction away of heat from the plate 24 is brought about. However, it is to be ensured that heat is not unnecessarily transferred to the piezoelectric tube 13. The heatsink corresponds essentially to the cooling water of the engine. This supplies the reference variable for the internal combustion engines.

A temperature differential builds up between the plates 22 and 24 of the heat-flow sensor. This is the larger the smaller the thermal conductivity of a third plate 23 of the heat-flow sensor, namely the plate 23, which is provided as a heat barrier.

It is important for the design of a combined pressure and heat-flow sensor according to the invention to ensure that as little heat as possible passes "backwards" to the heat-flow sensor from the pressure sensor or its system. The heat-flow sensor should only have a flow of heat in the direction from the plate 22 to the plate 24. Such a heat-flow sensor has, for example, a thickness of 20 $\mu m$.

If the temperatures $T_1$ and $T_2$ are measured on both sides of the heat barrier (plate 23) by means of the plates 22 and 24, the heat-flow density over the heat barrier is obtained as:

$$\frac{dQw}{dt} = \frac{w}{dw}(T_2 - T_1) \quad (1)$$

Here, w is the thermal conductivity of the heat barrier 23 and lwa its thickness. The heat-flow density perpendicularly through the diaphragm is:

$$\frac{dQm}{dt} = \frac{M}{dM}(T_1 - T_M) \quad (2)$$

TM designates the temperature of the (external) diaphragm surface which faces the combustion chamber, M is the thermal conductivity of the diaphragm 11 and dM its thickness. Since, due to the smaller thickness of the diaphragm 11, the heat flow in the plane of the diaphragm $$\frac{dQM}{dt} = \frac{DQw}{dt} \quad (3)$$

The heat flow, normalized over the surface, from the combustion ga into the diaphragm is given by:

$$\frac{dQG}{dt} = a(T_G - T_M) \quad (4)$$

Here, a is the coefficient of heat transferred from the combustion gas to the engine wall and $T_G$ the temperature of the combustion gas. The combination of the equations 2 and 4, taking into account (3), gives the following:

$$\frac{M}{dw}(T_2 - T_2) = a(T_G - T_M) \quad (5)$$

Since the coefficient of heat transfer varies with the pressure and the temperature in a highly nonlinear manner, it is stored as a group of characteristic curves. The temperature of the combustion gas and the heat flow out of the gas into the wall of the combustion chamber can be determined with the known coefficient of heat transfer by means of equation 5.

The figure shows a particularly simple variant of a heat-flow sensor according to the invention which is attached to the diaphragm 11. It permits the temperature of the wall of the combustion chamber to be determined.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction therefore, that the subject matter in the above depiction shall be interpreted as illustrative and not in a limiting sense.

What is claimed is:

1. A sensor for sensing physical variables in a combustion chamber of a pressure sensor having a pressure sensor element in a housing which has a pressure diaphragm as a portion of a wall thereof, the diaphragm separating an interior of the housing from the combustion chamber when the sensor is introduced in the engine, a heat-flow sensor which is integrated in the housing,
the heat-flow sensor being arranged in heat-contact inside the housing with an internal surface of the diaphragm
the heat-flow sensor having a first temperature sensor and a second temperature sensor,
the first temperature sensor being in heat-contact with the diaphragm and between said first temperature sensor and the second temperature sensor a heat barrier is provided, through which is a heat flow occurs from the first temperature sensor to the second temperature sensor and
the second temperature sensor being in heat-conducting contact with a cooling agent of the engine as a reference variable for the temperature of combustion gas in the combustion chamber.

2. The sensor as claimed in claim 1, wherein the pressure sensor has a piezoelectric sensor element that contacts the internal surface of the diaphragm.

3. The sensor as claimed in claim 1, wherein the heat barrier is a plate.

4. The sensor as claimed in claim 1, wherein the heat barrier consists of one of silicon dioxide and silicon nitride.

5. The sensor as claimed in claim 1, wherein a heat conductor has a first end resting against the heat-flow sensor and has an opposed second end connected to a heatsink.

* * * * *